United States Patent
Ge et al.

(10) Patent No.: US 7,920,465 B2
(45) Date of Patent: Apr. 5, 2011

(54) METHOD AND APPARATUS FOR TRANSMITTING THE CONTROL SIGNAL OF RESILIENT PACKET RING MEDIA ACCESS CONTROL

(75) Inventors: Xiang Ge, Shenzhen (CN); Fan Zhang, Shenzhen (CN); Shaohua Wang, Shenzhen (CN); Pengju Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1037 days.

(21) Appl. No.: 11/526,531

(22) Filed: Sep. 25, 2006

(65) Prior Publication Data

US 2007/0091829 A1   Apr. 26, 2007

Related U.S. Application Data

(63) Continuation of application No. PCT/CN2005/000494, filed on Apr. 13, 2005.

(30) Foreign Application Priority Data

May 10, 2004 (CN) .......................... 2004 1 0044464

(51) Int. Cl.
H04J 1/16 (2006.01)
(52) U.S. Cl. ........ 370/223; 370/222; 370/230; 370/225; 370/244
(58) Field of Classification Search .................. 370/258, 370/405, 395.51, 222, 223, 230, 225, 244
See application file for complete search history.

(56) References Cited

U.S. PATENT DOCUMENTS 6,977,912 B1   12/2005   Porter et al.
(Continued)

FOREIGN PATENT DOCUMENTS

EP   1 303 082 A2   4/2003
(Continued)

OTHER PUBLICATIONS

"Medium Access Control (MAC) Parameters, Physical Layer Interface, and Management Parameters," *IEEE Draft*, P802.17/D2.0: 1-515 (Dec. 10, 2002).
(Continued)

Primary Examiner — Ricky Ngo
Assistant Examiner — Dewanda Samuel
(74) Attorney, Agent, or Firm — Leydig, Voit & Mayer, Ltd.

(57) ABSTRACT

The present invention provides a method and apparatus for transmitting control signal of Resilient Packet Ring (RPR) Medium Access Control (MAC), including: encapsulating a control signal of RPR MAC interface to be transmitted into an RPR data frame of predefined format, and directly sending it to a receiving unit through a standard interface. In this invention, an RPR data frame of predefined format is utilized to transmit signals between an RPR MAC and a receiving unit, e.g., an RPR client, via standard interfaces, which may avoid the increase of unstable factors affecting signal transmission and hardware cost caused by the appending of hardware devices in the standard interfaces. Thus, the reliability of signal transmission is enhanced, and the hardware cost of communication system is reduced.

15 Claims, 3 Drawing Sheets

U.S. PATENT DOCUMENTS

| | | | |
|---|---|---|---|
| 7,551,599 B2 * | 6/2009 | Levit et al. | 370/351 |
| 7,619,987 B2 * | 11/2009 | Mitsumori | 370/254 |
| 2002/0018475 A1 | 2/2002 | Ofek et al. | |
| 2003/0074469 A1 * | 4/2003 | Busi et al. | 709/238 |
| 2003/0112829 A1 * | 6/2003 | Sridhar | 370/522 |
| 2003/0117946 A1 * | 6/2003 | Fontana et al. | 370/216 |
| 2003/0118041 A1 | 6/2003 | Fontana et al. | |
| 2005/0044272 A1 * | 2/2005 | Uzun et al. | 709/245 |
| 2005/0125562 A1 * | 6/2005 | Bhardwaj | 709/249 |
| 2006/0007854 A1 | 1/2006 | Yu | |
| 2006/0013215 A1 | 1/2006 | Kong et al. | |
| 2006/0222007 A1 * | 10/2006 | Karakawa et al. | 370/468 |
| 2006/0280120 A1 * | 12/2006 | Ramamurti et al. | 370/235 |

FOREIGN PATENT DOCUMENTS

| | | |
|---|---|---|
| GB | 2 350 976 A | 12/2000 |
| WO | WO 2004/008710 A1 | 1/2004 |
| WO | WO 2004/036836 A1 | 4/2004 |

OTHER PUBLICATIONS

Microsoft Computer Dictionary (Fifth Edition), Definition of "CRC," Microsoft Press, Redmond, Washington (2002).

* cited by examiner

METHOD AND APPARATUS FOR TRANSMITTING THE CONTROL SIGNAL OF RESILIENT PACKET RING MEDIA ACCESS CONTROL

This application is a continuation of International Patent Application No. PCT/CN2005/000494, filed Apr. 13, 2005, which claims priority to Chinese Patent Application No. 200410044464.9, filed May 10, 2004, all of which are hereby incorporated by reference.

FIELD OF THE INVENTION

The present invention relates to Resilient Packet Ring (RPR) network communications technology, and more particularly, to a method and apparatus for transmitting control signal of RPR Medium Access Control (MAC).

BACKGROUND OF THE INVENTION

Resilient Packet Ring (RPR) network is a new Metropolitan Area Network (MAN). FIG. 1 is a schematic diagram illustrating structure of the RPR network. As shown in FIG. 1, the RPR network is a kind of network with dual-ring structure, and it can at most support a connection of 255 nodes, which are numbered sequentially from node S0 to node S254. An outer ringlet of RPR network is called ringlet 0, while an inner ringlet is called ringlet 1. The portion bounded by two nodes is called span, each connection between two nodes is called link, and S254 congestion caused by total data flow from node S0 to node S254 is called congestion domain.

FIG. 2 is a schematic diagram illustrating a layer model of RPR network. As shown in FIG. 2, the RPR mainly concerns about communications of a MAC control sublayer and a MAC datapath sublayer within a data link layer with a MAC client of upper layer inside a reference model of Open System Interconnect (OSI). Generally, the MAC control sublayer and the MAC datapath sublayer within the data link layer are called RPR MAC for short, and the MAC client is called RPR Client.

Applications of various classes, such as ClassA, ClassB and ClassC, are supported by RPR services, and flow control may be carried out by communication systems for the RPR services sending from an RPR Client to an RPR MAC according to their priorities. The specific procedure is: when the RPR Client requires to transmit a data frame ranked ClassA, an indication signal sendA which indicates permission of sending the data frame ranked ClassA is conveyed to the RPR Client if the transmission is agreed by the RPR MAC, then the RPR Client will transmit the data frame ranked ClassA to the RPR MAC after receiving this indication signal. Similarly, when the RPR Client requires to transmit a data frame ranked ClassB or Class C, the interface of RPR Client will not transmit the data frame until receiving a corresponding indication signal sendB or sendC.

The above-mentioned sendA/B/C signals are control signals of RPR MAC, where the sendA signal is a 1-bit signal merely representing whether it is allowed to send a data frame ranked ClassA; the sendB signal is a 1-bit signal merely indicating whether a data frame ranked ClassB is allowed to be sent; the sendC signal is an 8-bit bus signal for denoting the hop count indication from the present node to a congested node in the RPR network. The interface of RPR Client, according to the hop count indication of sendC, will stop transmitting any data frames to nodes far from the congested node, and continue to transmit data frames to nodes near the congested node, so as to make full use of effective bandwidth of the RPR network.

In practical communication systems, functions of RPR Clients and RPR MACs are realized by different physical entities. For instance, an RPR Client is usually carried out by a network processor, which only provides standard interfaces, such as Synchronous Optical Network (SONET) Packet over SONET (POS) interfaces, System Packet Interfaces (SPI), Gigabit Medium Independent Interfaces (GMII) and so on; an RPR MAC is usually implemented by a Field Programmable Gate Array (FPGA) or an Application Specific Integrated Circuit (ASIC), and the sendA/B/C signals are especially for RPR MACs. At the RPR MAC side, 1 signal line is used to transmit sendA, 1 to transmit sendB and 8 to transmit sendC, so 10 signal lines in all are needed to transmit the sendA/B/C signals.

However, standard interfaces on the RPR Client side are not specially designed for RPR and unable to directly process the sendA, sendB and sendC signals sent from the RPR MAC. For instance, in a SPI3 standard interface, a Polling Transmit Packet Availability (PTPA) signal line is of similar function to the sendA/B/C signals, but there is only one PTPA signal line in the SPI3 standard interface whereas there are 10 signal lines for the sendA/B/C signals. Obviously, it is impossible to transmit the sendA/B/C signals to the RPR Client through the PTPA signal line in the SPI3 standard interface.

In order to transmit control signals between the RPR Client and the RPR MAC, an FPGA circuit is added into a standard interface of RPR Client in an existing scheme. With reference to FIG. 3, a gate array is modified within the FPGA according to status of control signal lines of both RPR Client and RPR MAC, so that the control signal of RPR MAC can be converted into a signal available to the standard interface of RPR Client. For instance, when the standard interface of RPR Client is SPI3, a number of paths are set inside the FPGA, where two of the paths are respectively connected to sendA and sendB signal lines of RPR MAC to receive these sendA and sendB signals, and toggle states of sendA and sendB signals are expressed by values of binary states. The other 256 paths are connected to sendC signal line through an internal array of FPGA, and respectively denote the 256 toggle values of sendC signal. The FPGA paths are corresponding to data queues of different priorities of RPR Client. The RPR Client obtains the sendA/B/C signals by means of enquiry manner of standard interface, that is, when a certain queue is to be transmitted, a enquiry request carrying a path number will be sent to the FPGA to inquire whether the queue corresponding to the path can be transmitted, then the FPGA will send out toggle state of the signal in this path according to the path number sent by the RPR Client. In this way, the conversion from 10 signals to 1 signal is completed, so that the sendA, sendB and sendC signals can be transmitted to the RPR Client through the FPGA.

However, in the above-described scheme, an FPGA chip is required in the standard interface to realize transmission of control signals of RPR MAC between the RPR MAC and the RPR Client, which may add to hardware cost of entire communication system and raise unstable factors that may affect signal transmission.

SUMMARY

The present invention is to provide a method and apparatus for transmitting control signal of RPR MAC, where the control signal of RPR MAC is directly transmitted to a receiving party through a standard interface. Thus, it may decrease hardware cost of communication system, and reduce unstable factors that may affect signal transmission.

A technical scheme of the present invention is as follows:

A method for transmitting control signal of Resilient Packet Ring (RPR) Medium Access Control (MAC), comprising:

encapsulating, by a sending unit, a control signal of RPR MAC into an RPR data frame of predefined format, and adding, by the sending unit, a specific identifier into the RPR data frame, the specific identifier is used to identify the existence of the control signal;

transmitting, by said sending unit, the RPR data frame to a receiving unit, wherein said RPR data frame contains the control signal of RPR MAC and specific identifier;

upon receiving the RPR data frame, analyzing, by the receiving unit, said RPR data frame to obtain the control signal of RPR MAC after determining that the RPR data frame contains the specific identifier.

An apparatus for transmitting control signal of RPR MAC, comprising:

an encapsulation module, for encapsulating the control signal of RPR MAC into an RPR data frame of predefined format, adding a specific identifier to the RPR data frame, the specific identifier is used to identify that the control signal is encapsulated in the RPR data frame;

a transmission module, for receiving the RPR data frame from the encapsulation module, and transmitting the RPR data frame;

a reception module, for receiving the RPR data frame from the transmission module, and after determining that the RPR data frame carries the control signal according to the specific identifier, analyzing the RPR data frame to obtain the control signal.

With the above-illustrated technical scheme, it is obvious that, since control signals of RPR MAC are encapsulated in data frames of predefined format in the present invention which can be transmitted directly by standard interfaces, the control signals of RPR MAC, such as an indication signal of RPR service priority, can be directly transmitted to the receiving party, e.g., RPR Client, through the standard interfaces. Thus, it will lower hardware cost of communication system, and reduce unstable factors affecting signal transmission. In addition, the present invention adopts state toggle detection to acquire control signals of RPR MAC in time; and sets a toggle counter to remove jitter for signals in practical circuits, so that indication signals of RPR service priority can be accurately obtained without jitter interference. Also, the present invention adopts a schedule transmission mode with high priority to transmit indication signals of RPR service priority in time, and sets a specific identifier and a check code to indicate the existence of a control signal of RPR MAC within an RPR data frame, so that the receiving party can accurately receive the control signal of RPR MAC by detecting the specific identifier and the check code, which would further increase reliability of signal transmission.

EMBODIMENTS OF THE INVENTION

The present invention will be described in detail hereinafter with reference to the accompanying drawings.

The embodiment of this invention mainly includes the following steps: encapsulating a control signal of RPR MAC to be transmitted into an RPR data frame of predefined format, and directly transmitting the RPR data frame to a receiving party through a standard interface, then the receiving party will analyze the data frame to obtain the control signal.

In this embodiment, in order to restrict transmission of control signals to standard interfaces between the RPR MAC and the receiving party, the control signals of RPR MAC to be transmitted are encapsulated into RPR data frames of predefined format. An RPR data frame can be directly transmitted through a standard interface, and thereby the control signal of RPR MAC within the RPR data frame can be transmitted through the standard interface merely. After receiving data frames carrying control signals, the RPR client will analyze the data frames to obtain the control signals, and perform corresponding operations according to those control signals.

Figure 4:
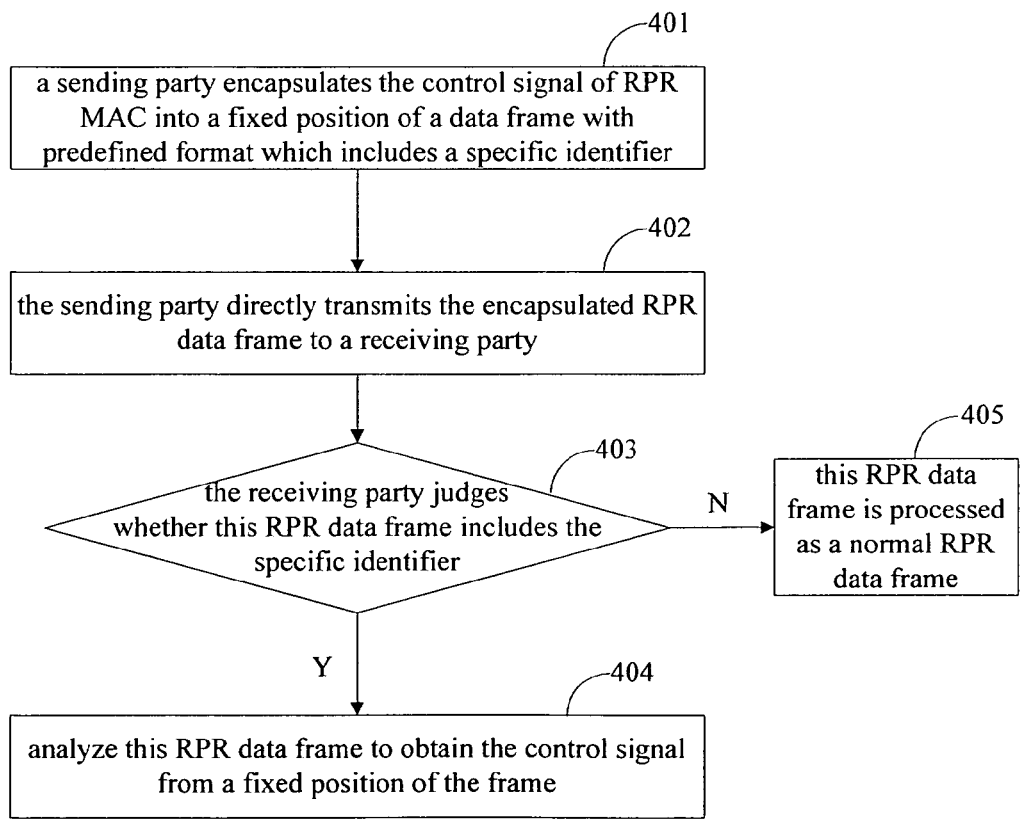
FIG. 4 is a flowchart illustrating a transmission procedure of control signal of RPR MAC in an embodiment of the present invention.

FIG. 4 is a flowchart illustrating a transmission procedure of a control signal of RPR MAC in an embodiment of the present invention. As shown in FIG. 4, this procedure includes:

Step 401: A sending party, namely RPR MAC, encapsulates the control signal of RPR MAC into a data frame of predefined format, where the control signal can be encapsulated at a fixed position of this RPR data frame, and a specific identifier is added in the RPR data frame to identify the existence of the control signal of RPR MAC within the RPR data frame.

Before Step 401, the procedure further includes: the sending party detects in real time whether a toggle occurs to the control signal of RPR MAC, if yes, execute Step 401; otherwise, continue to detect whether a toggle occurs with the control signal of RPR MAC.

In order to avoid jitter interference from the control signal, when the sending party finds that a toggle occurs with the control signal of RPR MAC, a further judgment may be carried out on whether another toggle is detected with the control signal during a preset period, if it is, continue to detect whether a toggle occurs with the control signal; otherwise, go to Step 401.

Step 402: The sending party directly transmits the encapsulated RPR data frame to a receiving party through data lines of a standard interface.

Steps 403~405: After receiving the RPR data frame, the receiving party judges whether this RPR data frame includes the specific identifier, if it does, the receiving party will analyze this RPR data frame to obtain the control signal from a fixed position of the frame; otherwise, this RPR data frame will be processed as a normal RPR data frame.

In the following embodiments, technical schemes of the present invention will be illustrated in detail hereinafter in the case that the receiving party is an RPR client and the control signal of RPR MAC is an indication signal of RPR service priority. However, the receiving party of this embodiment can be other physical entities, and the control signal of RPR MAC is not limited to the indication signal of RPR service priority, as well.

In the present embodiment, the RPR data frame of predefined format includes: a specific identifier used for indicating that a data frame carries an indication signal of RPR service priority, the indication signal of RPR service priority and a check code. Here, the specific identifier in this embodiment is an identifier of indication signal of RPR service priority, which is used to indicate that this RPR data frame of predefined format carries an indication signal of RPR service priority, and the check code is used to verify whether a transmission error occurs with the indication signal of RPR service priority during the course of transmission.

In the present embodiment, a format of the RPR data frame carrying the indication signal of RPR service priority is as shown in table 1:

Table 1

| byte | bit | | | | | | | |
|---|---|---|---|---|---|---|---|---|
| | 7 | 6 | 5 | 4 | 3 | 2 | 1 | 0 |
| first byte | Time To Live (TTL), which is set to 0 in this embodiment and represents an identifier of indication signal of RPR service priority | | | | | | | |
| second byte | RI | FE | FT | | SC | | sendA | sendB |
| third byte | sendC | | | | | | | |
| fourth byte | FCS | | | | | | | |

As shown in table 1, the RPR data frame of predefined format in this embodiment includes 4 bytes. The RPR data frame, which is usually transmitted through a standard interface between an RPR MAC and an RPR client, generally includes a 1-byte Time To Live (TTL) field, and the TTL field cannot be set as totally 0. Therefore, in order to distinguish this data frame which is for transmitting the indication signal of RPR service priority from other ordinary RPR data frames transmitted, it is required that, when content of the TTL field of an RPR data frame is totally 0, this RPR data frame is the one of predefined format for transmitting the indication signal of RPR service priority, namely that the identifier of indication signal of RPR service priority is manifested as a whole-0 TTL field that occupies the first byte of the RPR data frame. In another embodiment, other fields can also be defined to denote the identifier of indication signal of RPR service priority.

The second byte includes a ringlet identifier (RI) bit, a fairness eligible (FE) bit, a frame type (FT) field, a service class (SC) field, indication signals of RPR service priority sendA and sendB. Here, values of RI, FE, FT and SC are the same as existing definition of RPR data frames. In the existing definition, the RI is 1 bit long, and 0 represents an outer ringlet ringlet0 while 1 represents an inner ringlet ringlet1; the FE is 1 bit long as well with a constant value 1; the FT is 2 bits long with a constant value 00; the SC is 2 bits long with a constant value 10. Both the sendA and sendB signals are 1 bit long, and these two bits indicate toggle states of sendA and sendB respectively. The sequence of this byte from bit 0 to bit 7 is RI, FE, FT, SC, sendA and sendB in turn. For example, the second byte is x00010, when x is set as 1, it indicates that the data frame is sent from the inner ringlet; when x is set as 0, it indicates that the data frame is sent from the outer ringlet.

The third byte is a sendC signal. Values of the 8 bits of this byte respectively denote toggle states of the 8 bits of the sendC signal. The sendA, sendB and sendC signals are filled in the data field of the RPR data frame.

The fourth byte is a check code for the previous three bytes, and this check code may be 8-bit Cyclic Redundancy Check (CRC8) which is obtained through a check polynomial expression $X^8+X^7+X^4+X^3+X+1$.

After determining the RPR data frame of predefined format in Step 401, when an indication signal of RPR service priority to be transmitted is checked out, the signal thereof can be encapsulated into an RPR data frame of predefined format at once. Detailed encapsulation procedure is as follows: firstly, calculating and determining a check code according to the toggled indication signal of RPR service priority, and encapsulating the identifier of indication signal of RPR service priority, RI, FE, FT, SC, the toggled indication signal of RPR service priority and the calculated check code according to the predefined format in the above-mentioned table 1 into an RPR data frame.

After the RPR data frame is encapsulated according to the predefined format, a new RPR data frame transmission request is generated. Then, the RPR MAC will transmit the corresponding RPR data frame to the RPR client through a standard interface according to this request.

In the present embodiment, one method for detecting an indication signal of RPR service priority can be toggle detection, which is to detect change of the 10-bit signals of sendA, sendB and sendC in the present embodiment. Once a signal among these 10 signal lines is changed, the changed signals sendA, sendB and sendC should be encapsulated into a corresponding RPR data frame.

What's more, in practical circuits, jitter usually occurs to signals, so the signals sendA, sendB and sendC may be interfered by jitter as well. Therefore, an approach in the present embodiment is introduced to avoid generating RPR data frames frequently caused by jitter of the signals sendA, sendB and sendC. When a toggle is detected to occur with any signals among these 10 signal lines of sendA, sendB and sendC, the toggled signals sendA, sendB and sendC will be encapsulated into a corresponding RPR data frame respectively on condition that no other toggle is detected to occur during a preset period.

The above-mentioned preset period can be controlled by a toggle counter. For instance, when a toggle is detected to occur with any signals among the 10 signal lines of sendA, sendB and sendC, the toggle counter will restart to count, and when this toggle counter reaches the preset count value, the toggled signals sendA, sendB and sendC will be encapsulated into a corresponding RPR data frame. During the counting procedure of toggle counter, if another toggle is detected to occur with any signals among these 10 signal lines of sendA, sendB and sendC, the toggle counter will restart to count. In this way, the phenomenon of frequently generating RPR data frames because of jitter of the signals sendA, sendB and sendC can be avoided effectively.

The preset period can be configured according to practical requirement of communication systems. Apart from eliminating jitter, the preset period and the toggle counter may also delay the encapsulation of the signals sendA, sendB and sendC into an RPR data frame of predefined format for the preset period. At the same time, since the RPR client only responds to the indication signal of RPR service priority during frame intervals, the delay caused by the toggle counter when implementing jitter elimination will not bring harmful effects upon timeliness for processing the data frame carrying the indication signal of RPR service priority.

In the transmission procedure of Step 402, in order to assure that the encapsulated RPR data frame carrying the indication signal of RPR service priority may be transmitted in time, a schedule transmission mode with high priority is adopted by the RPR MAC to directly transmit the RPR data frame of predefined format to the receiving party. The schedule transmission mode with high priority includes: transmitting RPR data frames of predefined format by scheduling transmission paths with high priority between the sending party and the receiving party; or increasing priority level of the RPR data frames to be transmitted of predefined format.

Specifically, if the standard interface is an SPI3/4 interface, a multi-channel mode of SPI3/4 interface can be utilized to map the data frame with the indication signal of RPR service priority to a transmission path with higher scheduling priority than that of ordinary RPR data frames, which would ensure that transmission of an RPR data frame carrying an indication signal of RPR service priority is of low delay.

If the standard interface is a GMII/XGMII interface, priority of the RPR data frame carrying the indication signal of RPR service priority can be adjusted higher, so that this data frame would possess a higher priority over ordinary RPR data frames transmitted. However, owing to the entire frame transmission mode adopted by the GMII/XGMII interface, the data frame with higher priority cannot be sent until a previous RPR data frame is completely transmitted.

Based on the above illustration, those skilled in the art can preferentially schedule and transmit RPR data frames carrying indication signals of RPR service priority in other standard interfaces, such as a POS interface, according to transmission characteristic of those standard interfaces, which is not illustrated hereby in detail in this embodiment.

In Step 403~405 of this embodiment, after the RPR client receives the RPR data frame, if the first 8 bits of this data frame are 0000_0000, it means that it is an RPR data frame carrying an indication signal of RPR service priority, then the RPR client will check this data frame according to the check code, and obtain the indication signal of RPR service priority from the RPR data frame after the check procedure is succeeded, namely the RPR client will obtain sendA from bit 1 of the second byte, and sendB from bit 0 of the second byte and sendC from the third byte.

Figure 5:
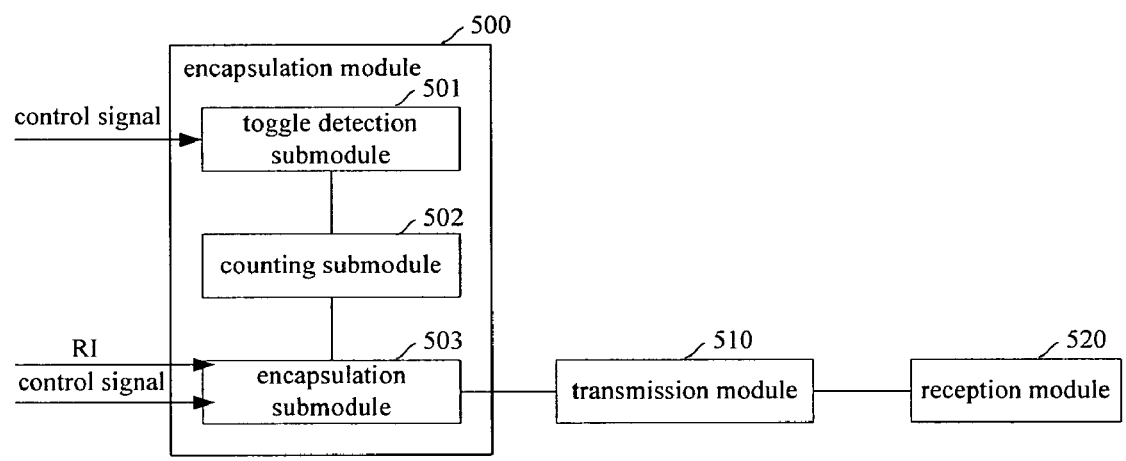
FIG. 5 is a schematic diagram illustrating an apparatus for transmitting control signal of RPR MAC in an embodiment of the present invention.

FIG. 5 is a schematic diagram illustrating a transmission apparatus for transmitting control signals of RPR MAC disclosed by an embodiment of the present invention. As shown in FIG. 5, the apparatus for transmitting control signals of RPR MAC includes: an encapsulation module 500, a transmission module 510 and a reception module 520.

Here, the encapsulation module 500 is used for encapsulating a control signal of RPR MAC into an RPR data frame of predefined format shown in table 1, adding a specific identifier for this RPR data frame to indicate that this RPR data frame carries a control signal of RPR MAC, e.g., marking the TTL field of the data frame as 0, and transmitting the encapsulated RPR data frame to the transmission module 510. As an embodiment, the control signal is an indication signal of RPR service priority.

The encapsulation module 500 further includes: a toggle detection submodule 501, a counting submodule 502 and an encapsulation submodule 503.

Here, the toggle detection submodule 501 is used for detecting the indication signal of RPR service priority, and transmitting an encapsulation command to the encapsulation submodule 503 once a toggle of the control signal is checked out.

The counting submodule 502 is an optional module adopted to avoid frequent generation of RPR data frames due to jitter of control signals, which is thereby named as jitter-removal module. Once an encapsulation command from the toggle detection submodule 501 is received, the counting submodule 502 starts to count as soon as possible, and transmits the received encapsulation command to the encapsulation submodule 503 when the count value reaches a predefined amount. If the encapsulation module 500 does not have a counting submodule 502, the encapsulation command from the toggle detection submodule 501 will be directly transmitted to the encapsulation submodule 503.

Figure 1:
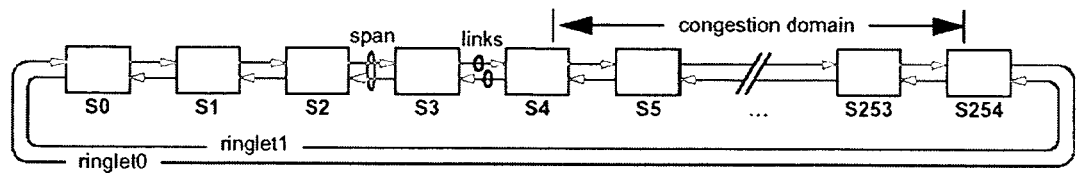
FIG. 1 is a schematic diagram illustrating structure of an RPR network.
Figure 2:
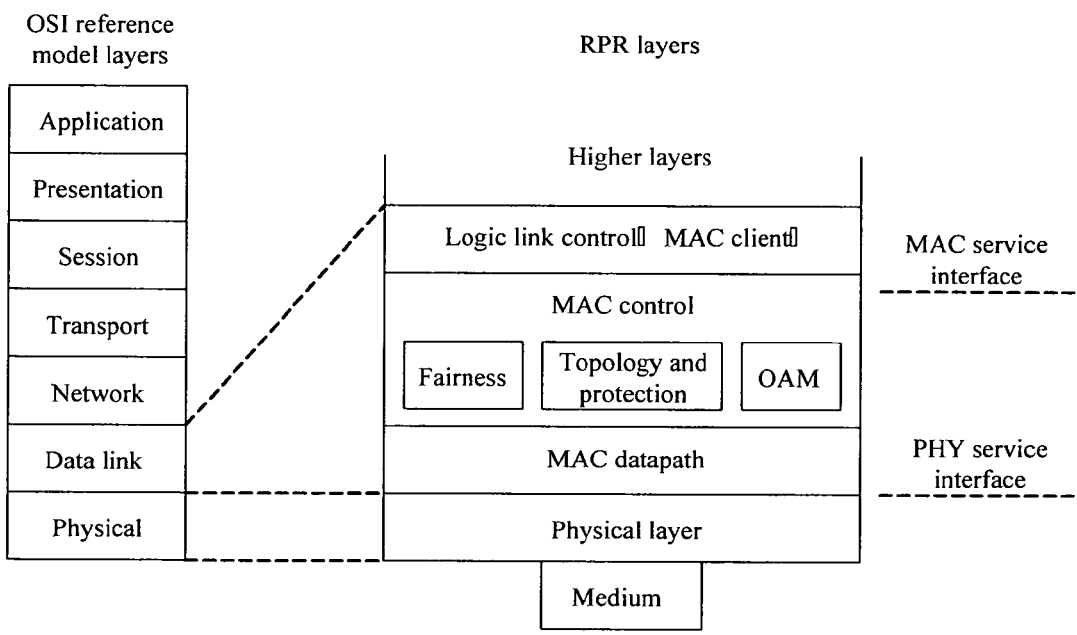
FIG. 2 is a schematic diagram illustrating an RPR network layer model.
Figure 3:
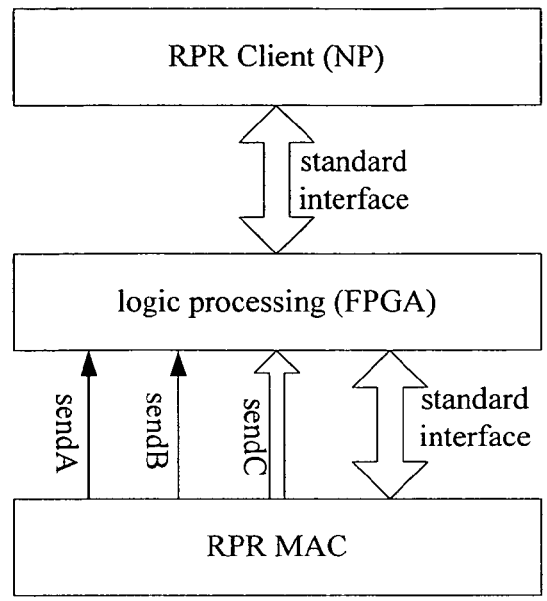
FIG. 3 is a schematic diagram illustrating a transmission procedure of control signal between the RPR MAC and the RPR client in the prior art.

After receiving the encapsulation command, the encapsulation submodule 503 will calculate and generate a check code according to the toggled indication signal of RPR service priority, encapsulate the 8-bit TTL field completely set as 0, RI, FE, FT, SC, the toggled indication signal of RPR service priority and the calculated check code into an RPR data frame according to the predefined format shown in FIG. 1, and then transmit the encapsulated data frame to the transmission module 510.

After receiving the RPR data frame carrying the indication signal of RPR service priority from the encapsulation submodule 503, the transmission module 510 adopts a schedule transmission mode with high priority to directly transmit this RPR data frame to the reception module 520 through signal lines of a standard interface. The adopted transmission mode is related to interface of the transmission module, for example, when an SPI3/4 interface is adopted, a transmission path with high priority is scheduled to transmit the RPR data frame of predefined format; when a GMII/XGMII interface is adopted, the priority of RPR data frame of predefined format is adjusted higher. When a POS interface is adopted, the RPR data frame carrying the indication signal of RPR service priority can also be transmitted preferentially according to the characteristic of POS interface.

The reception module 520 receives the RPR data frame of predefined format from the transmission module 520, and learns according to the specific identifier that this RPR data frame carries a control signal of RPR MAC, i.e., if the first 8 bits of this data frame are 0000_0000, the reception module 520 will verify this data frame according to the check code, and obtain the indication signal of RPR service priority from the successfully verified data frame. That is, obtain sendA from bit 1 of the second byte, sendB from bit 0 of the second byte and sendC from the third byte.

Although the present invention has been described with reference to preferable embodiments, it will be understood by those skilled in the art that various changes and equivalents may be substituted without departing from the spirit of the present invention, and it is hoped that the accompanying claims will include these variations and changes.

The above description is merely a preferable embodiment of the present invention, and the protection scope of this invention is not limited thereof. Various changes and replacements within the technical extent disclosed in this invention may be substituted by those skilled in the art without departing from the scope of the present invention.

The invention claimed is:

1. A method for transmitting control signal of Resilient Packet Ring (RPR) Medium Access Control (MAC), comprising:

detecting, by a sending unit, a state of a control signal;

deciding, by the sending unit, whether a toggle happens to the control signal;

if the toggle happens, encapsulating, by a sending unit, the control signal of the RPR MAC into an RPR data frame of a predefined format, and adding, by the sending unit, a specific identifier into the RPR data frame, wherein the specific identifier is used to identify an existence of the control signal;

adopting a high priority transmission channel to transmit the RPR data frame between the sending unit and a receiving unit, wherein said RPR data frame contains the control signal of the RPR MAC and the specific identifier; and upon receiving the RPR data frame, analyzing, by the receiving unit, said RPR data frame to obtain the control signal of the RPR MAC after determining that the RPR data frame contains the specific identifier.

2. The method according to claim 1, wherein during the detection of the state of the sending unit, the method further comprises: when it is detected that a toggle happens to the control signal, judging whether another toggle happens to the control signal during a preset period; if another toggle happens, performing the detection; otherwise, proceeding to the encapsulation.

3. The method according to claim 2, wherein the method comprises:

starting a counter when a toggle happens to the control signal; and when a value of the counter reaches a predefined amount, performing the encapsulation.

4. The method according to claim 1, wherein the specific identifier is set in a Time To Live (TTL) field of the RPR data frame.

5. The method according to claim 1, wherein the control signal is set in a data field of the RPR data frame.

6. The method according to claim 1, wherein the RPR data frame is transmitted from the sending unit to the receiving unit through a standard interface.

7. The method according to claim 1, wherein the receiving unit is an RPR client.

8. The method according to claim 1, wherein the control signal is an indication signal of a RPR service priority.

9. The method according to claim 8, wherein the indication signal comprises: an indication signal of permitting to send a data frame ranked ClassA, an indication signal of permitting to send a data frame ranked ClassB, and an indication signal of permitting to send a data frame ranked ClassC.

10. An apparatus for transmitting a control signal of RPR MAC, comprising:

an encapsulation module, for encapsulating the control signal of the RPR MAC into an RPR data frame of a predefined format, adding a specific identifier to the RPR data frame, wherein the specific identifier is used to identify that the control signal is encapsulated in the RPR data frame; wherein the encapsulation module comprises: a toggle detection submodule, for detecting a toggle state of the control signal, and sending an encapsulation command when a toggle of the control signal is detected; and an encapsulation submodule, for receiving the encapsulation command from the toggle detection submodule, calculating a check code for the control signal, adding the specific identifier, the control signal and the check code into the RPR data frame of the predefined format, and transmitting the RPR data frame;

a transmission module, for receiving the RPR data frame from the encapsulation module, and adopting a high priority transmission channel to transmit the RPR data frame; and a reception module, for receiving the RPR data frame from the transmission module, and after determining that the RPR data frame carries the control signal according to the specific identifier, analyzing the RPR data frame to obtain the control signal.

11. The apparatus according to claim 10, wherein the encapsulation module further comprises a counting submodule located between the toggle detection submodule and the encapsulation submodule;

wherein said counting submodule is for restarting a counter when receiving an encapsulation command, and transmitting the received encapsulation command to the encapsulation submodule when a value of the counter reaches a predefined amount.

12. The apparatus according to claim 10, wherein the transmission module comprises a Synchronous Optical Network (SONET) Packet over a SONET (POS) interface, or a System Packet Interface (SPI), or a Gigabit Medium Independent Interface (GMII).

13. The method according to claim 1, wherein: the specific identifier is set in a Time To Live (TTL) field of the RPR data frame, and the TTL is set to 0.

14. A method for transmitting control signal of Resilient Packet Ring (RPR) Medium Access Control (MAC), comprising:

detecting, by the sending unit, a state of a control signal;

deciding, by the sending unit, whether a toggle happens to the control signal, if the toggle happens, encapsulating, by a sending unit, the control signal of the RPR MAC into an RPR data frame of a predefined format, and adding, by the sending unit, a specific identifier into the RPR data frame, wherein the specific identifier is used to identify an existence of the control signal; and adopting a high priority transmission channel to transmit the RPR data frame to a receiving unit to be a analyzed by the receiving unit to obtain the control signal of the RPR MAC after determining that the RPR data frame contains the specific identifier, wherein said RPR data frame contains the control signal of the RPR MAC and the specific identifier.

15. An apparatus for transmitting a control signal of RPR MAC, comprising:

an encapsulation module, for encapsulating the control signal of the RPR MAC into an RPR data frame of a predefined format, adding a specific identifier to the RPR data frame, wherein the specific identifier is used to identify that the control signal is encapsulated in the RPR data frame; wherein the encapsulation module comprises: a toggle detection submodule, for detecting a toggle state of the control signal, and sending an encapsulation command when a toggle of the control signal is detected; and an encapsulation submodule, for receiving the encapsulation command from the toggle detection submodule, calculating a check code for the control signal, adding the specific identifier, the control signal and the check code into the RPR data frame of the predefined format, and transmitting the RPR data frame; and a transmission module, for receiving the RPR data frame from the encapsulation module, and adopting a high priority transmission channel to transmit the RPR data frame.

* * * * *